(12) United States Patent
Rieck et al.

(10) Patent No.: US 7,520,117 B2
(45) Date of Patent: Apr. 21, 2009

(54) AUGER STRIPPER ASSEMBLY FOR A COMBINE CORN HEAD

(75) Inventors: Steven Timothy Rieck, Cambridge, IL (US); John Chadwick Yagow, Kewanee, IL (US); Michael Wayne Mossman, Silvis, IL (US)

(73) Assignee: Deere & Company, Moline, IL (US)

( * ) Notice: Subject to any disclaimer, the term of this patent is extended or adjusted under 35 U.S.C. 154(b) by 99 days.

(21) Appl. No.: 11/588,667

(22) Filed: Oct. 26, 2006

(65) Prior Publication Data

US 2007/0186529 A1    Aug. 16, 2007

Related U.S. Application Data

(60) Provisional application No. 60/774,116, filed on Feb. 16, 2006.

(51) Int. Cl.
  *A01D 45/02* (2006.01)
  *A01D 45/10* (2006.01)
(52) U.S. Cl. ............................................................. 56/62
(58) Field of Classification Search ............... 56/62, 56/14.5, 126, 364, 341, 33, 34; 198/670, 198/671, 601, 733
  See application file for complete search history.

(56) References Cited

U.S. PATENT DOCUMENTS

| 2,270,471 | A |   | 1/1942  | Pilcher et al. |
| 3,021,662 | A | * | 2/1962  | Yaniuk ........................ 56/364 |
| 3,474,602 | A | * | 10/1969 | Molzahn ..................... 56/14.4 |
| 3,921,785 | A | * | 11/1975 | Huitink ....................... 198/601 |
| 4,290,259 | A | * | 9/1981  | Parvin et al. ................... 56/364 |
| 6,134,867 | A | * | 10/2000 | Goering et al. ................. 56/34 |
| 6,237,312 | B1 |   | 5/2001  | Becker |
| 6,679,042 | B1 | * | 1/2004  | Schrag et al. ................. 56/341 |

FOREIGN PATENT DOCUMENTS

DE       3820766 A1    1/1989
DE      10359398 B3    6/2005

OTHER PUBLICATIONS

Picture Of A Cornhead By Kemper.
European Search Report, dated Jul. 5, 2007, (6 pages).

* cited by examiner

*Primary Examiner*—Árpád Fábián-Kovács

(57) ABSTRACT

An auger stripper assembly for a combine head has first and second auger stripper fixed to a wall of the combine head, wherein one auger stripper is disposed above the other auger stripper.

10 Claims, 4 Drawing Sheets

AUGER STRIPPER ASSEMBLY FOR A COMBINE CORN HEAD

This application claims priority under 35 USC 120 to provisional patent application Ser. No. 60/774,116, filed Feb. 16, 2006, entitled "Stripper assembly for a combine corn head cross auger."

FIELD OF THE INVENTION

This invention relates to augers for combine corn heads. More particularly, it relates to auger strippers for corn head cross augers.

BACKGROUND OF THE INVENTION

The cross auger of a corn head conveys material from the row units to the center of the corn head and feeds the material into the combine feeder house. Typically, a single fixed auger stripper is used to keep the cross auger from wrapping with vines, grass, or damp tough corn stalks. The single fixed auger stripper is also used to keep crop material and corn ears held down so they feed into the combine feeder house.

However, typical corn head cross augers are adjustable so the auger moves away from the fixed auger stripper making the fixed auger stripper ineffective.

Also, a single auger stripper does not adequately keep corn ears down. If the corn ears are allowed to rise up above the center line of the auger tube they will typically be tossed or thrown forward in front of the feeder house opening causing grain loss and material piling on top of the row units directly in front of the feeder house. Material piling on the row units results in a loss of productivity.

A single fixed auger stripper does not adequately keep vines and damp corn stalks from wrapping around the cross auger causing the cross auger to plug or stall. This results in lost productivity.

Also, typical auger strippers are horizontal or are bent 90 degrees. This provides a horizontally-extending surface similar to a shelf or ledge on top of the auger stripper which permits crop material to accumulate thereon. This accumulated crop material can get wet and cause paint damage to the corn head. Furthermore, any pockets, corners or other places where crop material can accumulate can retain crop from prior harvesting sessions that can contaminate subsequently harvested crop materials of a different type.

What is needed, therefore, is an auger stripper that can be adjusted when the auger itself is adjusted. What is also needed is are auger strippers that do not accumulate grain or other plant material disposed on their top surfaces. What is further needed is are auger strippers that have enhanced control of vines and damp corn stalks. It is an object of this invention to provide one or more auger strippers that provide one or more these advantages.

SUMMARY OF THE INVENTION

In accordance with a first aspect of the invention, an auger stripper assembly for a combine head is provided, including a frame that extends laterally; a trough that extends laterally, fixed to the frame; a rear wall that extends laterally, fixed to the frame; an auger that extends laterally, having at least one flight, said auger being mounted for rotation on the frame and having a rotational axis; a first auger stripper that extends laterally, fixed to the rear wall and extending generally parallel to the rotational axis of the auger; and a second auger stripper f that extends laterally, fixed to the rear wall below the first auger stripper, said second auger stripper having an adjustable width measured in a fore-and-aft direction.

The second auger stripper may include a first elongate member that extends laterally, fixed to the rear wall, and a second elongate member that extends laterally, adjustably fixed to the first elongate member. The second auger stripper may include first and second elongate members bolted together. The first auger stripper may have a fixed width measured in a fore-and-aft direction. The first and second auger strippers may both be disposed at angles of between 30° and 90° with respect to vertical. The first and second auger stripper may be both disposed at angles of between 40 and 80° with respect to vertical. The first and second auger strippers may both be disposed at angles of between 50 and 70° with respect to vertical. The second auger stripper may be adjustable to a first plurality of distances from the auger flights, said first plurality of distances being between 5 millimeters and 50 millimeters of the auger flights when the auger is in a first position with respect to the rear wall of the combine. The second auger stripper may be adjustable to a second plurality of distances from the auger flights, said second plurality of distances being between 5 millimeters and 50 millimeters of the auger flights when the auger is in a second position with respect to the rear wall of the combine, said second position being different from said first position. The combine head may be a corn head.

DETAILED DESCRIPTION OF THE PREFERRED EMBODIMENTS

Figure 1:
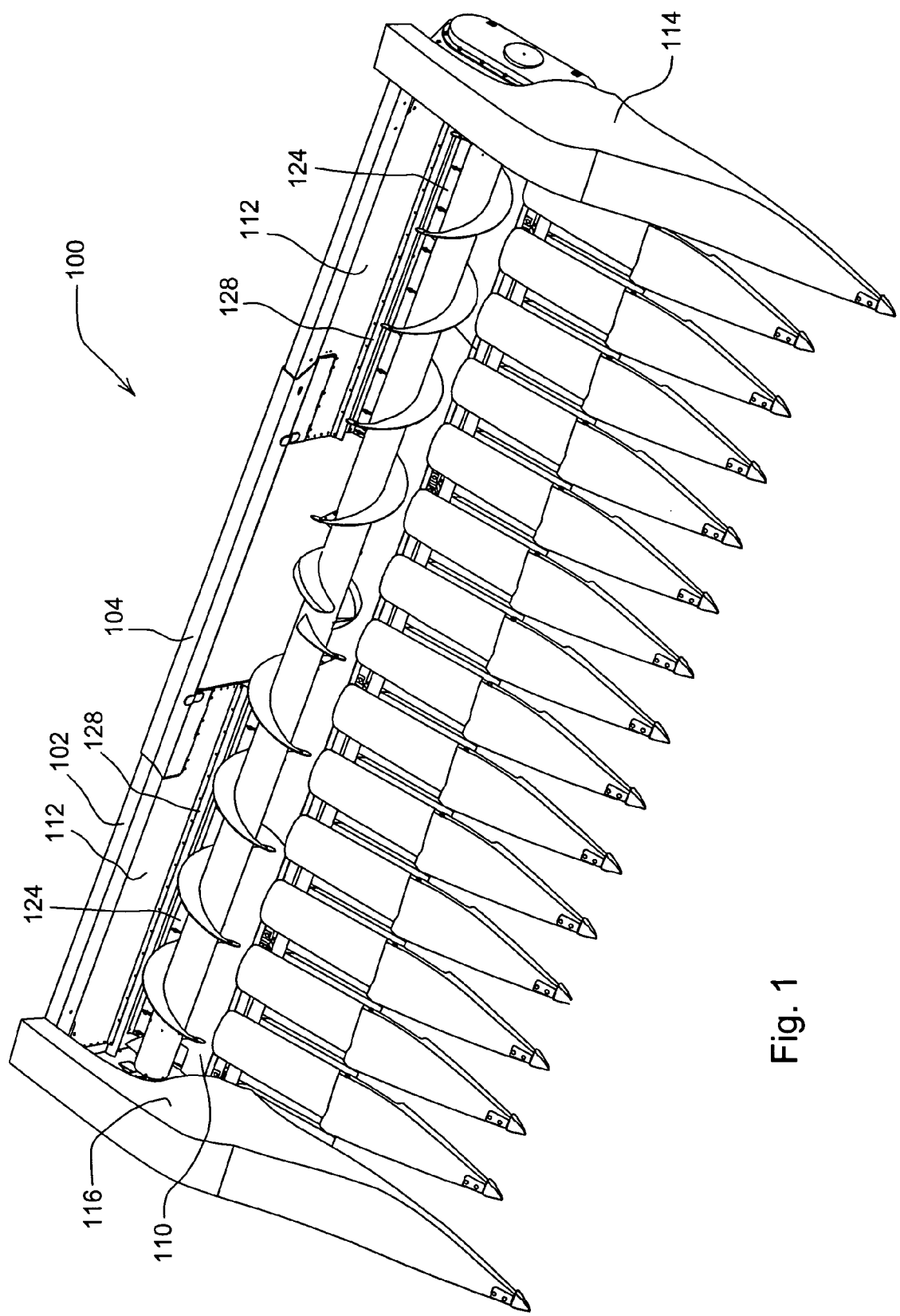
FIG. 1 is a perspective view of a combine head (illustrated herein as a corn head) in accordance with the present invention.
Figure 2:
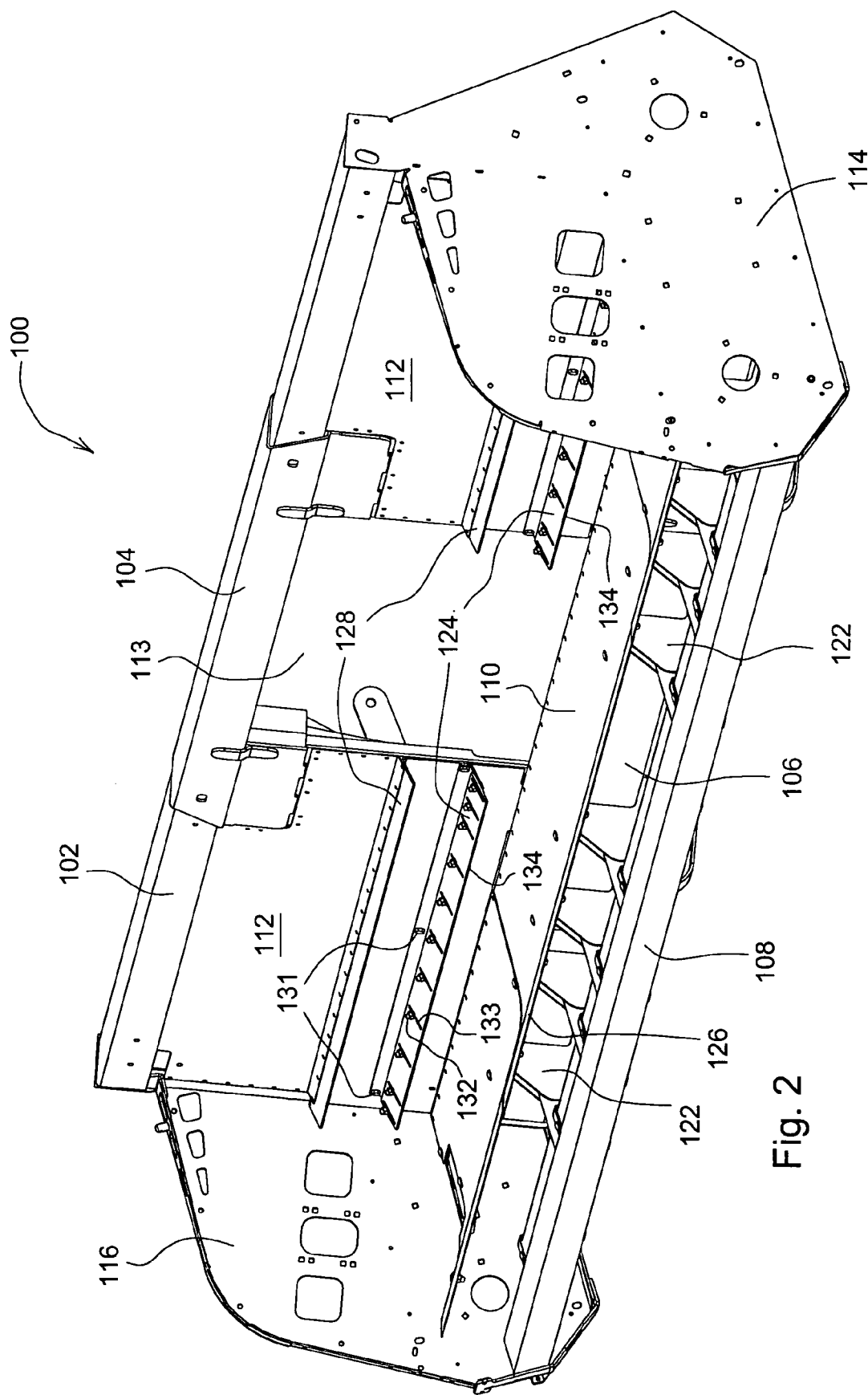
FIG. 2 is a perspective view of the frame of the FIG. 1 corn head showing more clearly the first and second auger strippers.
Figure 3:
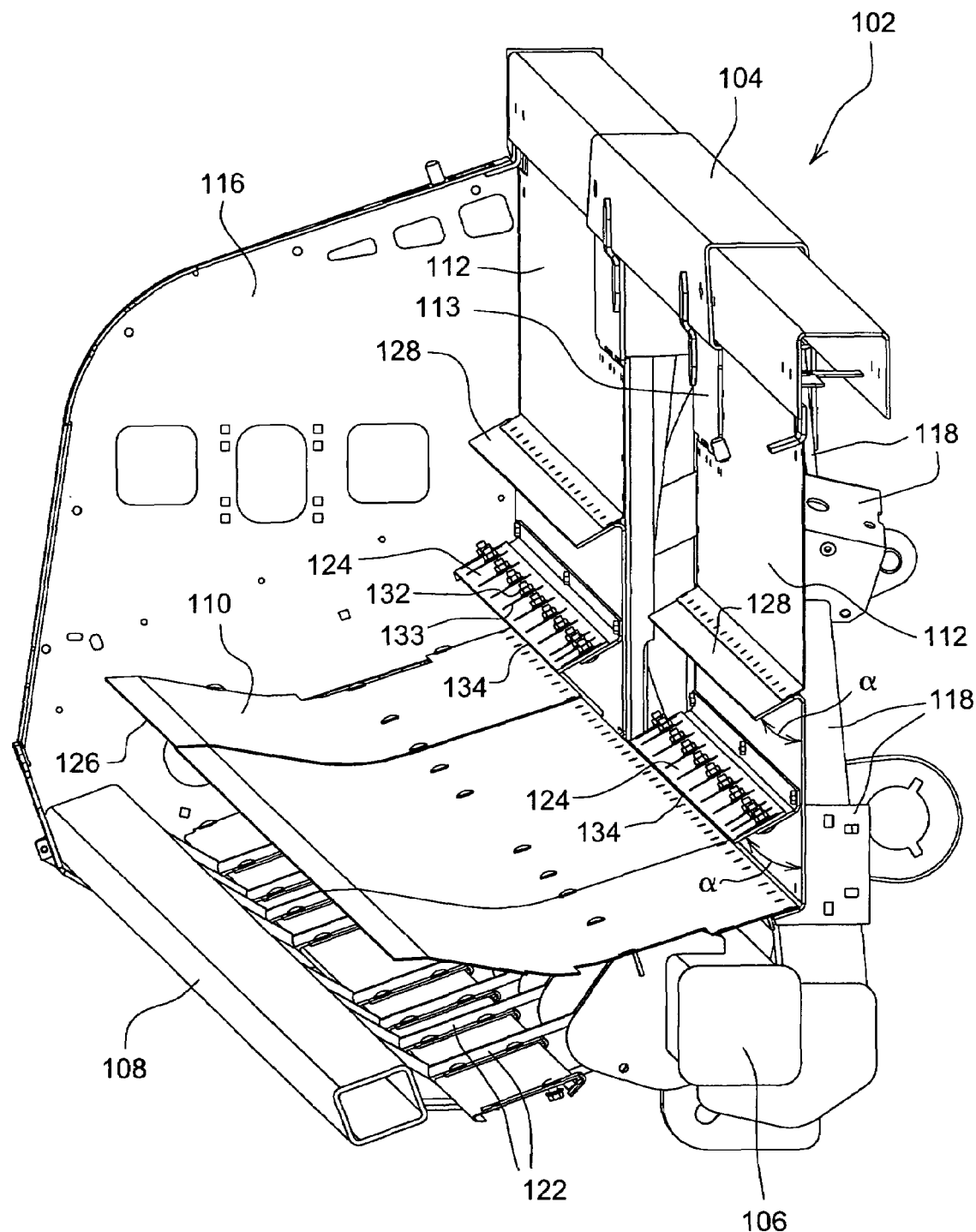
FIG. 3 is a left side cross-sectional perspective view of the corn head frame of FIGS. 1-2 in which the left end of the corn head has been removed for clarity.
Figure 4:
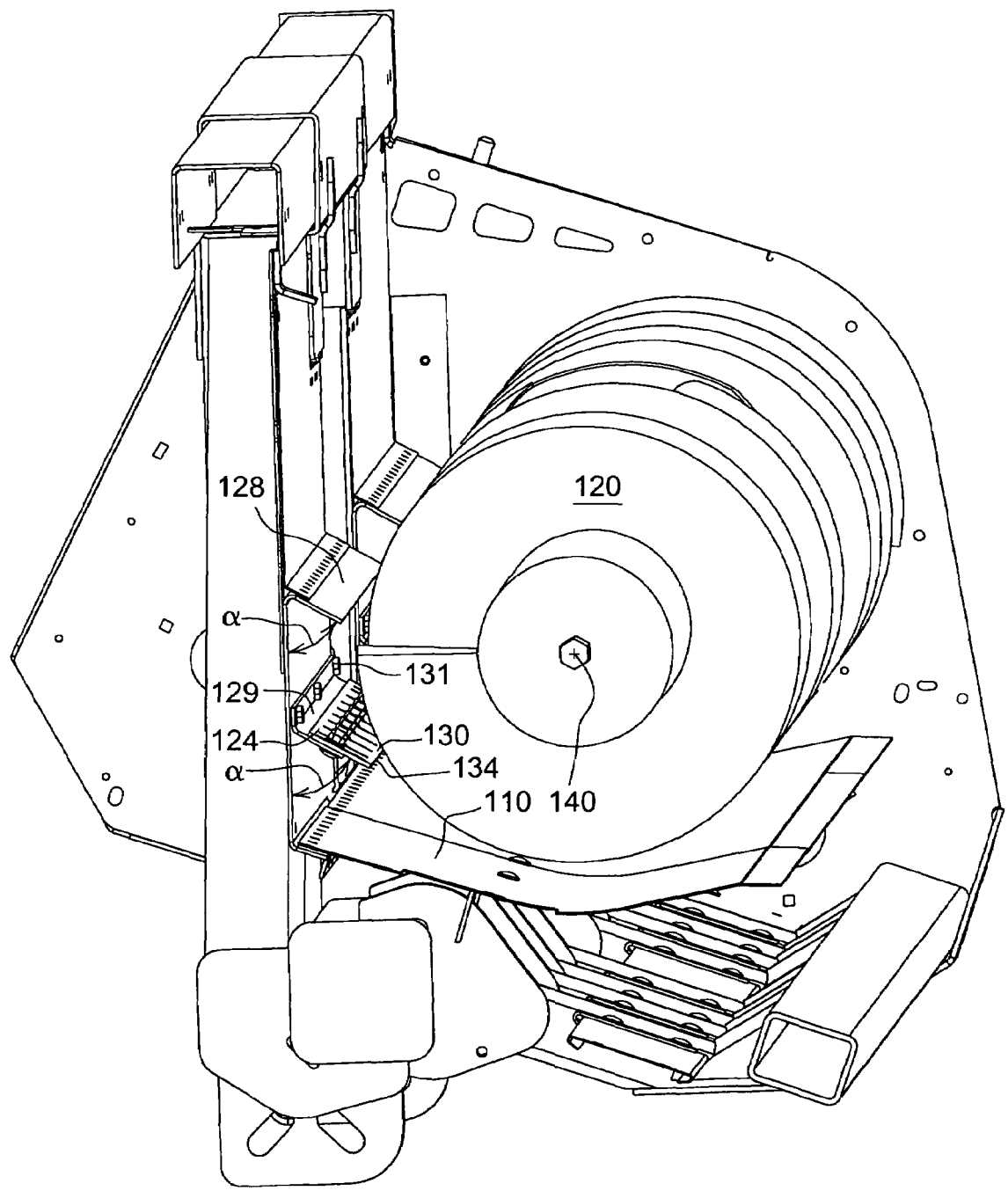
FIG. 4 is a right side cross sectional perspective view of the corn head frame of FIGS. 1-3 and including the auger in its operating position.

Referring now to FIGS. 1-4, a combine head (shown herein as a corn head 100) is illustrated. The corn head 100 comprises a frame 102 that extends laterally, and that further comprises an upper beam 104, a lower beam 106, and a corn unit support beam 108. The frame further comprises a trough 110, a rear wall 112 and left and right ends 114,116.

Beams 104, 106, and 108 extend laterally across the width of the corn head 100 in parallel relation to each other. They are welded to the left and right ends 114, 116. Ends 114,116 are generally planar, extending both vertically and longitudinally.

Rear wall 112 extends laterally and is formed of one or more steel panels or sheets that extend laterally across the width of the corn head and are welded to and between upper beam 104 and lower beam 106. An aperture 113 is disposed in the center portion of rear wall 112 below upper beam 104 and above lower beam 106. Aperture 113 provides an opening for the transmission of crop material from the corn head to the separating section of the combine (not shown).

Several cross members and stiffeners 118 are welded to and between upper beam 104 and lower beam 106 and to rear wall 112 to couple the rear wall and beams together.

Trough 110 extends laterally and is comprised of a laterally-extending curved sheet having a laterally-extending concave upper surface and having a cross-section taken by a vertical and longitudinal cutting plane that is generally constant over the entire length of the trough. Trough 110 is configured to receive auger 120, and to receive crop material deposited in the trough along its leading edge 126 by a plurality of row units (not shown) that are fixed to row unit support beam 108. Trough 110 merges with the rear wall 112 of the combine to provide a continuous surface extending the length of the corn head in a lateral direction and extending from the front of the auger adjacent to the row units around underneath the auger (auger trough 110), and up the rear wall 112 to a point above the centerline of auger 120.

Row unit support beam 108 provides a structure to which the row units are attached. It is welded to the front ends of a plurality of longitudinally-extending frame members 122, which in turn are welded at their rear ends to lower beam 106.

Auger 120 extends laterally, and is symmetric in a cross-section that is perpendicular to the auger's rotational axis 140. Auger 120 has a constant outside diameter over its entire length. It is formed of the central tube to which elongated spiral flights are welded. The auger is supported on the left and right ends 114,116 of corn head 100 for rotation with respect to corn head frame 102.

Auger 120 is spaced slightly apart from trough 110 in which it rotates. The outer edge of the auger flights do not touch the trough or the rear wall of the corn head. A slight gap is provided between the trough and the auger, and between the rear wall and the auger.

Auger 120 can be adjusted to any of a plurality of positions with respect to the frame, the auger trough and rear wall 112. Various structures for adjusting auger position are known in the art.

Two auger strippers 124,128 that extend laterally are fixed to rear wall 112 of the corn head. Auger stripper 124 is the lower of these two auger strippers, and includes a first elongate member 129 that is bolted (as shown herein) or welded to the rear wall 112 of the corn head extending laterally across the corn head parallel to the rotational axis of the auger 120. If first elongate member 129 is bolted to rear wall 112, it preferably includes an elongated bend along its rear edge to provide a vertically extending portion through which bolts 131 can be inserted and threaded into rear wall 112 in order to fix first elongate member 129 to rear wall 112.

Auger stripper 124 also includes a second elongate member 130 that is adjustably fixed to first elongate member 129. Second elongate member 130 is bolted to first elongate member 129 by plurality of bolts 132 that extend through slots 133 and holes formed in first and second elongate members 129 and 130. In one embodiment (not shown), through-holes are spaced apart along the length of first elongate member 129 that align with corresponding slots formed in second elongate member 130. In another embodiment (illustrated herein), through-holes are spaced apart along the length of second elongate member 130 that align with corresponding slots 133 formed in first elongate member 129. First and second elongate members 129 and 130 are generally planar. First elongate member 129 is fixed to rear wall 112 at a downwardly and forwardly descending angle alpha (shown as "α" in the FIGURES) of between 30 and 90 degrees of vertical. Angle alpha is more preferably between 40 and 80°. Even more preferably, angle alpha is between 50 and 70°. Most preferably, angle alpha is between 50 and 60°.

The leading edge 134 of auger stripper 124 preferably extends to within 1 centimeter of the outermost edge of the auger flights providing a gap of 1 centimeter or less between the leading edge and the auger flights. This gap is preferably adjustable by moving the position of second elongate member 130 with respect to first elongate member 129. Leading edge 134 is adjustable to a plurality of distances and positions from the outermost edge of the auger flights ranging from 5 millimeters away from the auger flights to 50 millimeters away from the auger flights in at least one auger position. This permits the operator to adjust in a first auger position.

When the auger is moved to at least the second position with respect to rear wall 112, the auger trough and the corn head frame, leading edge 134 is also adjustable to a plurality of distances and positions from the outermost edge of the auger flights ranging from 5 millimeters away from the auger flights to 50 millimeters away from the auger flights in at least this second auger position as well. Thus, even when the operator moves the auger from one position to another, he still has the capability of adjusting the leading edge 134 of auger stripper 124 with respect to the auger flights in order to optimize the performance of auger stripper 124 regardless of the auger position.

Most, if not all, of auger stripper 124 is disposed below the rotational axis 140 of the auger and above the lowermost extent of the auger flights. Auger stripper 124 is preferably fixed to rear wall 112 below the rotational axis of the auger and above the lowermost extent of the auger flights. The bottommost edge of auger stripper 124 is preferably disposed below the rotational axis of the auger and above the lowermost extent of the auger flights.

Auger stripper 126 is fixed to rear wall 112 of the corn head and extends laterally across the corn head parallel to the longitudinal axis of the auger 120. Auger stripper 126 is preferably welded to rear wall 112, although it may be bolted to the rear wall in the same manner that auger stripper 124 is bolted to the wall. Auger stripper 126 is disposed at the same angle alpha ("α") as auger stripper 124. Auger stripper 126 is preferably not adjustable, although it may be adjustable in the same manner and in the same way as auger stripper 124. Auger stripper 126 is disposed vertically below the uppermost extent of the auger flights and above the rotational axis of the auger. The leading edge 134 of auger stripper 126 preferably extends to within 2 centimeters of the edge of the auger flights providing a gap of 2 centimeters or less between the two.

What is claimed is:

1. An auger stripper assembly for a combine head having a frame that extends laterally; a trough that extends laterally, fixed to the frame; a rear wall that extends laterally; an auger that extends laterally and having at least one flight, said auger being mounted for rotation on the frame and having a laterally extending rotational axis, the auger stripper assembly comprising: a first auger stripper that extends laterally, fixed to the rear wall and extending generally parallel to the rotational axis of the auger; and a second auger stripper that extends laterally, fixed to the rear wall below the first auger stripper, said second auger stripper having an adjustable connection between the rear wall and the auger providing an adjustable width measured in a fore-and-aft direction.

2. The auger stripper assembly of claim 1, wherein the second auger stripper includes a first elongate member that extends laterally, fixed to the rear wall and a second elongate member that extends laterally, adjustably fixed to the first elongate member.

3. The auger stripper assembly of claim 1, wherein the second auger stripper includes first and second elongate members bolted together.

4. The auger stripper assembly of claim 3, wherein the first auger stripper has a fixed width measured in a fore-and-aft direction.

5. The auger stripper assembly of claim 1, wherein the first and second auger strippers are both disposed at angles of between 30° and 90° of vertical.

6. The auger stripper assembly of claim 1, wherein the first and second auger strippers are both disposed at angles of between 40 and 80° of vertical.

7. The auger stripper assembly of claim 1, wherein the first and second auger strippers are both disposed at angles of between 50 and 70° of vertical.

8. The auger stripper assembly of claim 1, wherein the second auger stripper is adjustable to a first plurality of distances from the at least one auger flight, said first plurality of distances being between 5 millimeters and 50 millimeters of the auger at least one auger flight when the auger is in a first position with respect to the rear wall of the combine.

9. The auger stripper assembly of claim 8, wherein the second auger stripper is adjustable to a second plurality of distances from the at least one auger flight, said second plurality of distances being between 5 millimeters and 50 millimeters of the at least one auger flight when the auger is in a second position with respect to the rear wall of the combine, said second position being different from said first position.

10. The auger stripper assembly of claim 1, wherein the combine head is a corn head.

* * * * *